April 15, 1930.   D. W. NEARING   1,754,903
MEASURING RULE
Filed Sept. 21, 1925
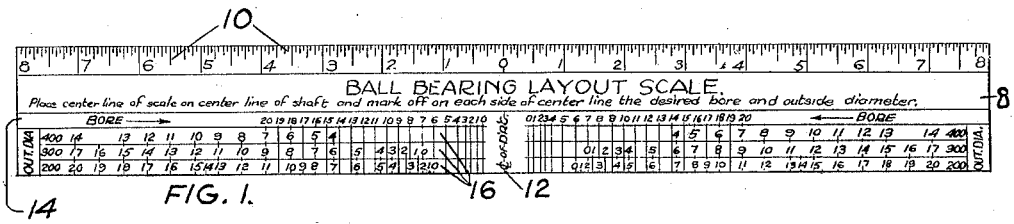
FIG. 1.
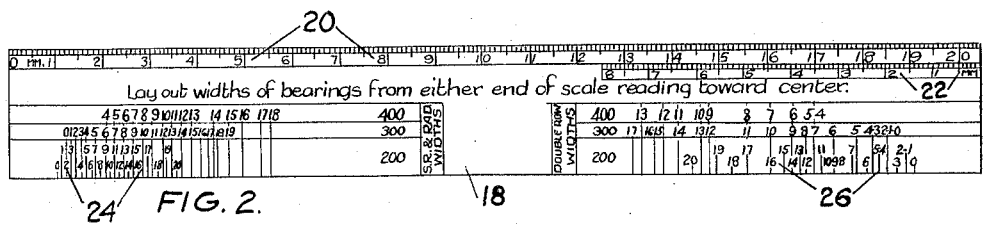
FIG. 2.
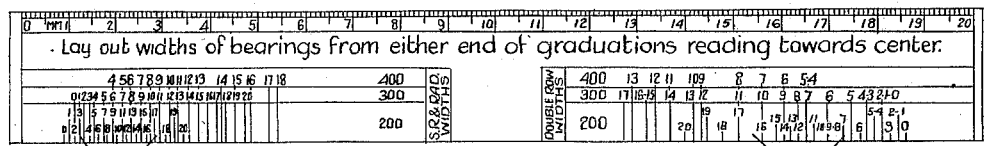
FIG. 3.
| DOUBLE ROW BEARING DATA | | | | | | |
|---|---|---|---|---|---|---|
| BEARING NO. | BORE | | DIAMETER | | WIDTHS | |
| | M/M | INCHES | M/M | INCHES | M/M | INCHES |
| 5 207 | | | 72 | 2.8347 | 26.99 | 1.0625 |
| 5 307 | 35 | 1.3780 | 80 | 3.1496 | 34.92 | 1.375 |
| 5 407 | | | 100 | 3.9370 | 44.45 | 1.750 |
| 5 208 | | | 80 | 3.1496 | 30.16 | 1.1875 |
| 5 308 | 40 | 1.5748 | 90 | 3.5433 | 36.51 | 1.4375 |
| 5 408 | | | 110 | 4.3307 | 49.21 | 1.9375 |
FIG. 4.
| SINGLE ROW BEARING DATA | | | | | | |
|---|---|---|---|---|---|---|
| BEARING NO. | BORE | | DIAMETER | | WIDTHS | |
| | M/M | INCHES | M/M | INCHES | M/M | INCHES |
| 1207 | | | 72 | 2.8347 | 17 | .6693 |
| 1307 | 35 | 1.3780 | 80 | 3.1496 | 21 | .8263 |
| 1407 | | | 100 | 3.9370 | 25 | .9843 |
| 1208 | | | 80 | 3.1496 | 18 | .7087 |
| 1308 | 40 | 1.5748 | 90 | 3.5433 | 23 | .9055 |
| 1408 | | | 110 | 4.3307 | 27 | 1.0630 |
| RADAX BEARING DATA | | | | | | |
|---|---|---|---|---|---|---|
| BEARING NO. | BORE | | DIAMETER | | WIDTHS | |
| | M/M | INCHES | M/M | INCHES | M/M | INCHES |
| 0207 | | | 72 | 2.8347 | 17 | .6693 |
| 0307 | 35 | 1.3780 | 80 | 3.1496 | 21 | .8263 |
| 0407 | | | 100 | 3.9370 | 25 | .9843 |
| 0208 | | | 80 | 3.1496 | 18 | .7087 |
| 0308 | 40 | 1.5748 | 90 | 3.5433 | 23 | .9055 |
| 0408 | | | 110 | 4.3307 | 27 | 1.0630 |
INVENTOR;
DUDLEY W. NEARING
BY Gales P. Moore.
HIS ATTORNEY.

Patented Apr. 15, 1930

1,754,903

UNITED STATES PATENT OFFICE

DUDLEY W. NEARING, OF NEW BRITAIN, CONNECTICUT, ASSIGNOR TO THE NEW DEPARTURE MANUFACTURING COMPANY, OF BRISTOL, CONNECTICUT, A CORPORATION OF CONNECTICUT

MEASURING RULE

Application filed September 21, 1925. Serial No. 57,753.

This invention relates to measuring rules and comprises all the features of novelty herein disclosed, by way of example, as embodied in a measuring rule for laying out and identifying antifriction bearings.

Commercial ball bearings and roller bearings are usually identified by a certain number which indicates both the kind of bearing, as single row, double row, etc., and determines the various dimensions. The data for bore, outside diameter, width, etc. of these numbered bearings is usually printed in tabular form and, to lay out such a bearing, the tables must be consulted. This practice is slow and subject to error in selecting the proper lines and columns. It is accordingly an object of the invention to provide a measuring rule by which a bearing can be quickly laid out by scaling off the dimensions and by which a bearing having certain measurable dimensions can be quickly selected or identified. Another object is to provide a means of laying out and selecting bearings which will eliminate the need for a table of sizes. Another object is to provide a rule to facilitate the measurement of the diameter, as by measuring a radius and reading off the diameter directly from half scale graduations.

To these ends and also to improve generally upon devices of the character indicated my invention consists in the various matters hereinafter described and claimed.

Figure 1 is a view of one side of the improved measuring scale.

Figure 2 is a view of the other side of the rule.

Figure 3 is a modification of Figure 2.

Figure 4 is a selected portion of a table of bearing indicia commonly employed.

The numeral 8 indicates the measuring rule having size graduations 10 marked off at the upper edge in two directions from a center line 12, the size graduations being to half scale and numbered as from 1 to 8. In the illustrated rule, the major graduations are half inches numbered as inches. This enables the user to place the center line of the rule at the center of any illustrated bearing and read off the diameter directly. According to one system of identifying bearing sizes, (illustrated in Figure 4) bearings are numbered in three series, as a 200 series, a 300 series, and a 400 series, the larger numbers in any series indicating bearings that are larger as to bore, outside diameter, width, etc. However, the bore is the same for a 207 bearing, a 307 bearing, and a 407 bearing, for example, while for these three sizes the outside diameter and width are progressively greater. Accordingly, the final identifying size numbers of the 200 series, 300 series, and 400 series of bearings can be marked off on the rule in a group on one line 14 designated "Bore" and the index lines of these numbers are arranged in alignment with the corresponding dimensional edge graduations 10 of the main scale. The outside diameter, however, being different for the various sizes of these three "hundred" series, a separate line or group 16 of bearing identity markings is made for each series and the final identifying size numbers in each of these three lines have their index lines marked off in congruent alignment, crosswive of the rule, with the dimensional graduations on the main scale. At the end of the rule, opposite these three lines 16, the rule is marked with the cognomen "Out dia," representing outside diameters. This bearing identity indicia is marked off in two directions from the center line 12 of the rule so that measurements can be made to left or right from the center of the bearing and from the center line of the rule.

For laying out the widths of bearings, the other side 18 of the rule has dimensional graduations 20 of a different character which are marked off at the upper edge of the rule and numbered. In the illustrated form, the graduations are millimeters laid off from the left end of the rule and numbered as from 1 to 20 and a second series of graduations 22 is laid off from the right end of the rule and numbered as from 1 to 8. In congruent alignment with these dimensional edge markings, the rule is provided with markings 24 and 26 representing the corresponding bearing identity numbers for the three series and these markings are laid off from the ends of the rule and proceed towards the center and are in two groups (left and right) which represent different types of bearings, as single row and "radax," and double row bearings, respectively. Bearing numbers of the 200 series, 300 series, and 400 series, according to the illustrated system, have different numbers prefixed thereto to indicate the kind of bearing. A single row bearing is indicated by prefixing a "1," as 1207, 1307, 1407, etc., a "radax" or angular contact bearing is indicated by prefixing "0" as 0207, 0307, and 0407, etc. and a double row bearing is indicated by prefixing a "5" as 5207, 5307, and 5407, etc. This will be apparent from the table in Figure 4 which is an illustrative portion of a bearing table commonly employed. It will be seen from this table that the bores or inside diameters are the same for 5207, 5307, 5407, 1207, 1307, 1407, 0207, 0307, 0407. Sometimes, no prefix number is used and this indicates a double row bearing.

It is also apparent from the table that a 5207 double row bearing has a greater width than a single row 1207, or radax 0207, but that the widths are the same for the single row 1207 and radax 0207, etc. Hence on the back side 18 of the scale, one group of markings (such as the left group 24) will serve for both single row and radax bearings and will indicate the bearing sizes in the different series having the widths represented by the corresponding markings. The other, or right hand, group of markings 26 does the same for the double row series which are wider bearings. The two groups are designated by the cognomens "S. R. & Rad. widths" and "Double row widths", respectively. It should be understood that all the sets of bearing identity symbols, on both sides of the rule, except that group indicated by the cognomen "Double row widths", will serve for measuring any one of the types of bearings, and that prefixing "1" or "0" or "5" before the 200 or the 300 or the 400 merely designates single row, "radax", and double row bearings, respectively. If desired, the graduations 22 may be omitted and the millimeter scale 20 may begin and end a little way from the ends of the rule to avoid mutilation. See Figure 3. In this case, the groups of markings 24 and 26 may be laid off from zero lines which are in alignment with the index lines indicating zero and 20 millimeters, respectively, instead of being laid off from the exact ends of the rule.

In use, assume the bearing number as 5208 is known and it is desired to lay out its bore from a given center. With the center line 12 of the scale at this center, find, in the "bore" line 14, the index line of number 8 and follow the line to the lower edge of the scale and mark off its distance from the center line. To find the outside diameter, enter the lowest line 16, marked "200" and find the index line of number 8 and follow this line as before to the lower edge of the scale and mark the outside diameter. To find the width, turn the rule over, and, since this number "5208" indicates a double row bearing, enter the right hand group of markings 26 in the lowest line, find the index line of number 8 and mark off its distance from the end of the rule. This distance is the same as that which would be obtained by finding the dimension in a table and measuring it off with the millimeter scale. Similar procedure is followed for any other numbered bearing in this series or in the 300 or 400 series. If the bearing number begins with a "1" or an "0", this "1" or "0" is ignored except when measuring widths but the width must be measured on the left scale on the back of the rule because these numbers designate single row and radax bearings. This distance is laid off from the left end of the rule to the proper index line. Conversely, if the bore or the outside diameter of a bearing is given or can be measured on a scale drawing, and it is desired to identify the bearing by size number, follow this given dimension from the proper index line on the upper edge scale 10 or 20 down to the corresponding line marked "Bore" or "Outside diameter" or "Width" and find the number corresponding. There will be only one number in the bore line corresponding to a given bore but for outside diameter or width there will be a different numbered bearing for each series, whether 200, 300, or 400 series. The proper series number is then selected by trying the other dimension and only one series will coincide with both requirements.

Although the invention has been described by reference to an illustrated construction, it should be understood that the invention, in its broader aspects, is not necessarily limited to the specific construction selected for mere illustrative purposes.

I claim:

1. In a device of the character described, a measuring rule having a center line, size graduations representing bearing diameters laid off to half scale in opposite directions from the center line, and bearing identity symbols comprising series of bearing size numbers laid off in opposite directions from the center line to correspond to said graduations; substantially as described.

2. A measuring rule having at one edge a series of numbered markings representing bearing dimensions, bearing identifying numbers marked off on the face of the rule in a plurality of series, each numbered marking in one series being in proper crosswise alignment with the edge markings to indicate a certain dimension of the corresponding bearing, and each numbered marking in another series being aligned crosswise with the edge markings to indicate another dimension of the corresponding bearing; substantially as described.

3. In a device of the character described, a measuring rule having a center line, size graduations laid off to half scale in opposite directions from the center line to indicate diameters, and two sets of bearing identity symbols laid off on said rule from the center line and each comprising series of bearing size numbers, for determining the identity of bearings having inner and outer diameters corresponding to the size graduations; substantially as described.

4. In a device of the character described, a measuring rule having size indicia marked off thereon by numbered graduations, and bearing identity indicia comprising series of bearing size numbers marked off to correspond, said identity indicia being arranged in two groups, each group having independent markings arranged in congruent alignment with the size indicia for indicating the identity and a corresponding dimension of a bearing; substantially as described.

5. In a device of the character described, a measuring rule having dimensional graduations representing bearing diameters marked off on one side thereof, bearing identity indicia comprising series of bearing size numbers marked off to correspond, the other side of the rule having dimensional graduations representing bearing widths, and bearing identity indicia comprising series of bearing size numbers marked off in congruent alignment with said last graduations; substantially as described.

6. A measuring rule having size graduations at one edge to measure bearing diameters, a series of numbered markings on the face of the rule, the numbered markings in the series representing bearing identifying size numbers and each marking being so located in crosswise alignment with respect to the edge graduations as to determine the outside diameter of a bearing having the identifying size number, and a second series of numbered markings on the face of the rule and placed nearer to the zero of the edge graduations, the said markings representing bearing identifying size numbers and each marking being so located in crosswise alignment with respect to the edge graduations as to determine the inside diameter or bore of a bearing having the identifying size number; substantially as described.

7. In a device of the character described, a measuring rule having a center line, a plurality of series of numbered markings laid off in opposite directions from the center line, the numbered markings in each series representing bearing identifying size numbers, the size numbers in one series being arranged nearer to the center line than the corresponding size numbers in another series, each marking in the first series being spaced from the center line a distance to measure the inside diameter or bore of a bearing having the identifying size number, and each corresponding marking in the other series being spaced a greater distance from the center line to measure the outside diameter of the same bearing; substantially as described.

8. A measuring rule having a series of numbered markings laid off from a line of reference, the numbered markings representing bearing identifying size numbers, each marking being spaced from the line of reference a distance to measure one dimension of the corresponding bearing, the other side of the rule having a corresponding series of numbered markings laid off from a line of reference, each numbered marking being spaced from the line of reference a distance to measure another dimension of the corresponding bearing; substantially as described.

9. A measuring rule having size graduations at one edge to measure bearing diameters, a series of numbered markings on the face of the rule, the numbered markings representing bearing identifying size numbers and each marking being arranged in alignment crosswise of the rule with a corresponding size graduation at the edge of the rule to determine the diameter of a bearing having the identifying size number, the other side of the rule having size graduations at one edge to measure another dimension of a bearing, and a series of numbered markings on said side of the rule, the numbered markings representing bearing identifying size numbers corresponding to the first series of markings and each marking being arranged in alignment crosswise of the rule with a corresponding size graduation to determine another dimension of the bearing having the identifying size number; substantially as described.

10. A measuring rule having size graduations at one edge to measure bearing dimensions, a plurality of series of numbered markings on the face of the rule, the numbered markings in each series representing bearing identifying size numbers of that series, and each marking in a series being arranged in crosswise alignment with a corresponding size graduation at the edge of the rule to determine the dimension of a bearing having the identifying size number of that series; substantially as described.

In testimony whereof I hereunto affix my signature.

DUDLEY W. NEARING.